United States Patent [19]

Seelig et al.

[11] Patent Number: 5,352,407
[45] Date of Patent: Oct. 4, 1994

[54] LEAD-FREE BISMUTH FREE TIN ALLOY SOLDER COMPOSITION

[76] Inventors: Karl F. Seelig, 32 Deck St., Jamestown, R.I. 02835; Donald G. Lockard, 85 Meadow, North Providence, R.I. 02904

[21] Appl. No.: 52,518

[22] Filed: Apr. 29, 1993

[51] Int. Cl.⁵ .............................................. C22C 13/00
[52] U.S. Cl. .................................. 420/561; 420/560; 420/562
[58] Field of Search ......................... 420/560, 561, 562

[56] References Cited

U.S. PATENT DOCUMENTS

| | | | |
|---|---|---|---|
| 3,503,721 | 3/1970 | Lupfer | 420/557 |
| 4,695,428 | 9/1987 | Ballentine et al. | 420/560 |
| 4,758,407 | 7/1988 | Ballentine et al. | 420/561 |
| 4,778,733 | 10/1988 | Lubrano et al. | 420/560 |

FOREIGN PATENT DOCUMENTS 0183037   6/1966   U.S.S.R. .................. 420/561

*Primary Examiner*—Upendra Roy
*Attorney, Agent, or Firm*—Barlow & Barlow, Ltd.

[57] ABSTRACT

A lead-free and bismuth-free solder alloy composition for electronic assembly applications having reduced toxicity. The alloy composition consists of, in weight percent, 93–98% tin, 1.5–3.5% silver, 0.2–2.0% copper, and 0.2–2.0% antimony. The alloy composition has a melting temperature of 210°–215° C. with superior wetting and mechanical strength making the alloy composition well suited for electronic circuit board manufacture and replacement of conventional tin-lead solders.

17 Claims, No Drawings

LEAD-FREE BISMUTH FREE TIN ALLOY SOLDER COMPOSITION

BACKGROUND OF THE INVENTION

Electronic manufacturing of printed circuit boards and the assembly of components onto boards use tin lead solders to provide a mechanical and electrical connection. Tin-lead solders yield highly reliable connections in automated soldering and manual soldering and provide a very solderable surface on printed circuit boards.

There are four specific areas of use for this solder.

1. Coating of circuit boards is accomplished in printed circuit board manufacture by "hot-air leveling" or "roll-tinning". This process improves solderability on the circuit board.
2. Assembly of electronic components on printed circuit boards is accomplished by use of these same tin lead alloys in a wavesoldering machine.
3. Assembly of electronic components using solder wire and a heating device to hand solder the components to the board.
4. Assembly of electronic surface mount components on printed circuit boards is accomplished by use of these same tin lead alloys in automated heating devices.

The alloy composition of the present invention has a melting temperature of 210°–215° C.

The use of tin-lead solders for this purpose is becoming more of a problem because of the toxic effects of lead exposure to workers and the generation of hazardous waste. In addition moves are afoot to limit the amount of lead going into our environment.

Because of the above there is a need to have a solder with no toxic elements that have physical characteristics and similar application performance as tin lead when applied as in sections 1, 2, & 3.

DISCLOSURE OF INVENTION

A composition containing tin, copper, antimony, and silver has been demonstrated to have the physical characteristics and application performance to meet the three methods described in 1, 2, & 3. This alloy does not cause lead exposure problems and the elements used do not show significant toxic dangers to workers or the environment.

Compositions containing elements such as bismuth were reviewed and eliminated from widespread acceptance for the following reasons:

a. Bismuth is typically mined from lead ores, therefore lead production has to be maintained to economically extract bismuth.
b. There are not enough known reserves of bismuth to satisfy the demands of lead in the electronics industry.
c. Bismuth compositions show reduced wetting and very poor peel strength characteristics for electronic soldering.

Therefore the invention had to be made from elements available in sufficient quantity in the earth's crust, while at the same time allowing a stable cost to the industry.

DETAILED DESCRIPTION OF THE INVENTION

This invention contains the following range of elements:

| | |
|---|---|
| tin | 93 to 98% |
| silver | 1.5 to 3.5% |
| copper | .2 to 2 |
| antimony | .2 to 2 |

The nominal range of this alloy is:

| | |
|---|---|
| tin | 96.2% |
| silver | 2.5% |
| copper | .8% |
| antimony | .5% |

This alloy exhibits adequate wetting and melting temperatures, as well as superior physical strength, electrical conductivity, thermal cycling fatigue resistance, and other physical characteristics to be a ready substitute for the tin lead alloys currently used for electronics assembly and printed circuit board manufacture. Most current capital equipment used in electronic soldering can employ used for this composition. The melting temperature is low enough not to cause heating damage to the board or components.

In method number 1 for the coating of printed circuit boards, the new composition has superior wetting characteristics and improved productivity. The tin lead alloy currently used is easily contaminated by the copper from the PC Boards that are dipped into the bath. Since this composition contains copper, minor increases in copper content do not readily affect performance of the composition. In addition, this composition will not absorb copper as quickly as tin lead solders. The result is this alloy can remain functional much longer than tin lead alloys reducing overall solder consumption drastically and saving money for the manufacturers.

Moreover it extends the solderability of the coated board since the intermetallics are distributed evenly throughout the grain boundary of this composition. The result is a higher quality printed circuit board.

Method 2 for the automated assembly (wavesoldering) of components to printed circuit boards. This composition can use the same pot temperatures, preheat temperatures, and process parameters as tin lead solders currently in use. The nominal composition is very close to a eutectic alloy exhibiting physical characteristics important to high speed low defect soldering.

The new composition has many of the elements that cause contamination of tin lead solders in wavesoldering. Because of this the solder is less easily contaminated than tin lead, and manufacturers can expect increased usable life of their solder bath.

Solder joints formed with this alloy show higher joint strengths, electrical conductivity, and exhibit even distribution of intermetallics throughout the solder joint.

Method three requires a composition that wets and spreads quickly at 250 to 300 c. This composition can be made into a cored wire solder and used easily in handsoldering.

What is claimed is:

1. A lead-free bismuth-free solder alloy composition for electronic assembly applications having reduced toxicity and a melting point between 210° C. and 215° C. consisting of in weight percent:

| | |
|---|---|
| 93–98% | tin |
| 1.5–3.5% | silver |

| | |
|---|---|
| 0.2–2.0% | copper |
| 0.2–2.0% | antimony. |

2. The alloy composition of claim 1, wherein a flux core is inserted into the composition to form an electronic assembly flux cored wire solder.

3. The alloy composition of claim 1, wherein the composition constitutes a fluxed core of flux and the alloy particles.

4. The alloy composition of claim 1, wherein said alloy composition is formed into a solder bar; said solder bar being used in electronic assembly solder machines.

5. The alloy composition of claim 1, wherein said alloy composition is formed into a solder ingot, said solder ingot being used in electronic assembly.

6. The alloy composition of claim 1, wherein said alloy composition is formed into a solder wire, said solder wire being used in electronic assembly.

7. The alloy composition of claim 1, wherein said alloy composition is formed into a solder chip, said solder chip being used in electronic assembly.

8. The alloy composition of claim 1, wherein said alloy composition is formed into a solder ribbon, said solder ribbon being used in electronic assembly.

9. The alloy composition of claim 1, wherein said alloy composition is formed into a solder powder, said solder powder being used in electronic assembly.

10. The alloy composition of claim 1, wherein said alloy composition is formed into a solder preform, said solder preform being used in electronic assembly.

11. The alloy composition of claim 1, wherein said alloy is employed in hot air levelling of printed circuit boards.

12. The alloy composition of claim 1, wherein said alloy is employed in assembling surface mounted printed circuit boards.

13. The alloy composition of claim 1, wherein said alloy is employed in the solder coating of printed circuit boards.

14. The alloy composition of claim 1, wherein said alloy is employed in roll tinning of circuit boards.

15. The alloy composition of claim 1, wherein said alloy is employed in surface mount assembly of electronic components onto a printed circuit board.

16. The alloy composition of claim 10, wherein said solder preform is fluxed.

17. The alloy composition of claim 10, wherein said solder preform is unfluxed.

* * * * *